United States Patent [19]

Mori

[11] Patent Number: 4,969,288

[45] Date of Patent: Nov. 13, 1990

[54] NURTURING DEVICE FOR LIVING ORGANISMS

[76] Inventor: Kei Mori, 3-16-3-501, Kaminoge, Setagaya-ku, Tokyo, Japan

[21] Appl. No.: 837,454

[22] Filed: Mar. 7, 1986

[30] Foreign Application Priority Data

Mar. 19, 1985 [JP] Japan ............................. 60-55244

[51] Int. Cl.⁵ .............................................. A01G 9/00
[52] U.S. Cl. .................................. 47/17; 47/DIG. 6; 47/1.1
[58] Field of Search ................... 47/1 A, 1.1, 1.4, 17, 47/59-65, 79, DIG. 6; 362/32, 805; 126/139-141

[56] References Cited

U.S. PATENT DOCUMENTS

| | | | |
|---|---|---|---|
| 1,121,722 | 12/1914 | Fessenden | 47/17 |
| 1,632,254 | 6/1927 | Vinogradov | 47/DIG. 6 |
| 3,362,104 | 1/1968 | Oswald et al. | 47/1.4 |
| 4,057,933 | 11/1977 | Enyeart | 47/1 A |
| 4,077,158 | 3/1978 | England | 47/1.1 |
| 4,141,498 | 2/1979 | Marschner | 47/17 |
| 4,198,953 | 4/1980 | Power | 47/17 |
| 4,255,897 | 3/1981 | Ruthner | 47/DIG. 6 |
| 4,352,256 | 10/1982 | Kranz | 47/17 |
| 4,461,278 | 7/1984 | Mori | 126/440 |

FOREIGN PATENT DOCUMENTS

| | | | |
|---|---|---|---|
| 108362 | 5/1984 | European Pat. Off. | 47/DIG. 6 |
| 1305861 | 1/1985 | European Pat. Off. | 47/DIG. 6 |
| 570343 | 11/1973 | U.S.S.R. | 47/DIG. 6 |
| 743635 | 6/1980 | U.S.S.R. | 47/17 |
| 980659 | 12/1982 | U.S.S.R. | 47/DIG. 6 |

OTHER PUBLICATIONS

Anon. "Get Twice the Performance in One Twincubator" (leaflet in 47/17) of Scientific Systems Corporation, Baton Rouge, La., four pages date stamped 4/19/72.

Dempewolff, R. F., "Gardens to Feed Our Spacemen", [Popular Mechanics, vol. 113, No. 6, Jun. 1960, only pp. 123, 124, 125, 126, 127, 236, 238, 240 and 242.

*Primary Examiner*—James R. Feyrer
*Attorney, Agent, or Firm*—Jordan and Hamburg

[57] ABSTRACT

A nurturing device for effectively nurturing living organisms such as plants, fish, etc. in desert areas of tropical regions by use of unused second-hand containers and a solar ray collecting device. The device comprises a plurality of containers and a solar ray collecting device. The solar rays collected by use of the solar ray collecting device are guided into the containers respectively through optical conductor cables for the purpose of nurturing living organisms therein.

1 Claim, 7 Drawing Sheets

NURTURING DEVICE FOR LIVING ORGANISMS

BACKGROUND OF THE INVENTION

The present invention relates to a nurturing device for living organisms i.e. a nurturing device for effectively nurturing living organisms such as plants, fish, etc. by use of reuseable containers and a solar ray collecting device.

The present applicant has previously proposed various ways to focus solar rays by use of lenses or the like, to guide the same into an optical conductor cable, and thereby to transmit the solar rays onto an optional desired place through the optical conductor cable. The solar rays transmitted in such a way are employed for use in illumination or for other like purposes, for instance to cultivate chlorella, to grow tomatoes or other plants, and for fish culture.

Furthermore, as in the case of guiding solar rays into an optical conductor cable and transmitting the same therethrough as mentioned above, specific kinds of light rays contained in solar rays, for instance infrared, ultraviolet, or X-rays are harmful to living organisms and can be removed, and only visible light rays component of the solar rays can be supplied to living organisms. Furthermore, since the infrared rays component thereof is cut out, the possible heat build-up is eliminated, allowing plants and animals to be effectively nurtured.

In desert areas of tropical regions, plants, fish, etc., cannot be nurtured because of the harmful rays which are present in unfiltered solar rays and also because of their strong intensity and great difference in the temperature range.

SUMMARY OF THE INVENTION

A primary object of the present invention is to effectively utilize solar rays in desert areas of tropical regions.

Another object of the present invention is to nurture plants and fish, to cultivate chlorella, or to promote the human body's health and perform medical treatment, by effectively utilizing reuseable containers.

Still another object of the present invention is to nurture plants and fish, to cultivate chlorella, or to promote the human body's health and perform medical treatment, by effectively utilizing a solar rays collecting device and reuseable containers.

BRIEF DESCRIPTION OF THE DRAWINGS

FIG. 5 is a view showing an embodiment of a device for cultivating plants;

FIG. 6 is a view showing an embodiment of a device for cultivating plants and mushrooms;

FIG. 7 is a view showing an embodiment of a device for nurturing plants and fish;

FIG. 8 is a view showing an embodiment of a device for cultivating chlorella and for fish culture; and FIG. 9 is a view showing an embodiment of a device for promoting the human body's health or giving an patient medical treatment for a wound or the like.

DESCRIPTION OF THE PREFERRED EMBODIMENT

Figure 1:
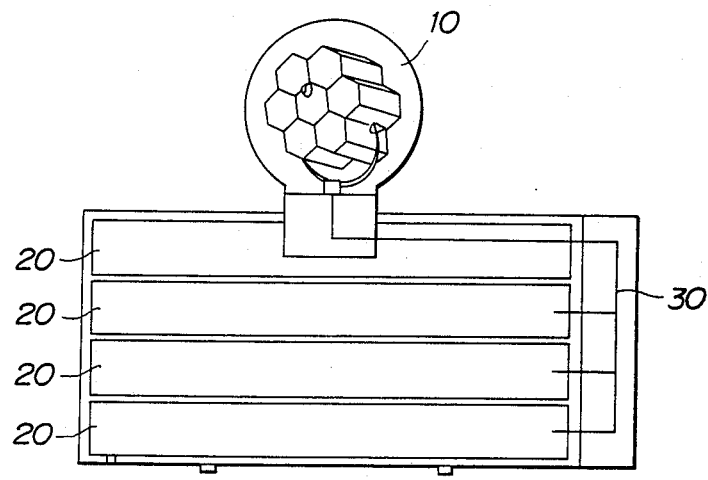
FIGS. 1 and 2 are, respectively, structural views for explaining embodiments according to the present invention.

FIG. 1 is a structural view for explaining an embodiment of a nurturing device for living organisms according to the present invention. In FIG. 1, 10 is a solar ray collecting device, 20 a plurality of containers, and 30 optical conductor cables. The primary object of the present invention is to make effective use of unused reuseable containers. As is well known, the afore-mentioned containers are constructed with adiabatic (heat-proof) and air-tight materials. Consequently, although such containers are installed on ground-level in desert areas of tropical regions, the temperature inside the containers can be kept at a suitable level for nurturing living organisms. Therefore plants or fish can be nurtured inside the containers by guiding light rays into them. In the case of installing the containers by piling them up on top of each other as shown in FIG. 1, the solar rays are not supplied directly to the lower containers. As a result, the rising tmeperature can be suppressed effectively. Furthermore, in the case of installing the solar ray collecting device on the uppermost container and by putting a part of the lower portion of the solar ray collecting device in the uppermost container, the solar ray collecting device can be prevented from being over-heated.

In such a manner, plants, fish, or mushrooms, etc. can be nurtured inside the container 20. In the case of nurturing plants, since the containers are constructed with air-tight material, etc. carbon dioxide $CO_2$ necessary for photosynthesis can be supplied to the plants inside of the containers. Plants absorb carbon dioxide $CO_2$ and produce oxygen $O_2$ through the process of photosynthesis, and fish, or mushrooms absorb oxygen $O_2$ and discharge carbon dioxide $CO_2$. Therefore, it is necessary to provide one container for nurturing plants and another container for nurturing fish or mushrooms. If those containers are connected with each other in such a manner that carbon dioxide $CO_2$ can be exchanged for oxygen $O_2$, it will be possible to nurture those living organisms much more effectively.

Figure 2:
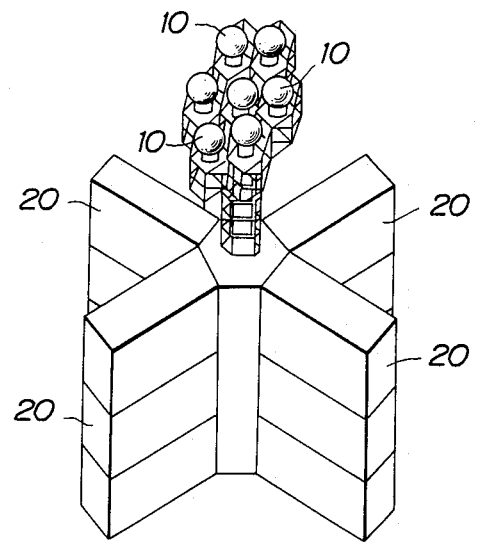

FIG. 2 is a structural, perspective view for explaining another embodiment of a nurturing device for living organisms, according to the present invention, in which the containers as mentioned above are piled up in a radial state. In such a construction, the solar ray collecting device 10 is installed on the central portion of the containers arranged in a radial state so that solar rays can be supplied to living organisms by use of a large number of containers and short optical conductor cables 30.

Furthermore, if inlet opening and outlet opening are provided at the central portion side of the respective containers arranged in a radial state, the conditions in the containers can be easily observed. The upper portion of the space formed at the central portion of the radially arranged containers is closed by the solar ray collecting device 10, and the side portions of the same space are closed by the respective containers 20. As a result, a shaded area can be created in the above-mentioned space in order to provide a suitable place for an observer to stay therein.

As is apparent from the foregoing description, according to the present invention, living organisms such as plants, fish, or mushrooms, can be much more effectively nurtured in desert areas of tropical regions by effective use of (unused, reuseable containers.)

Figure 3:
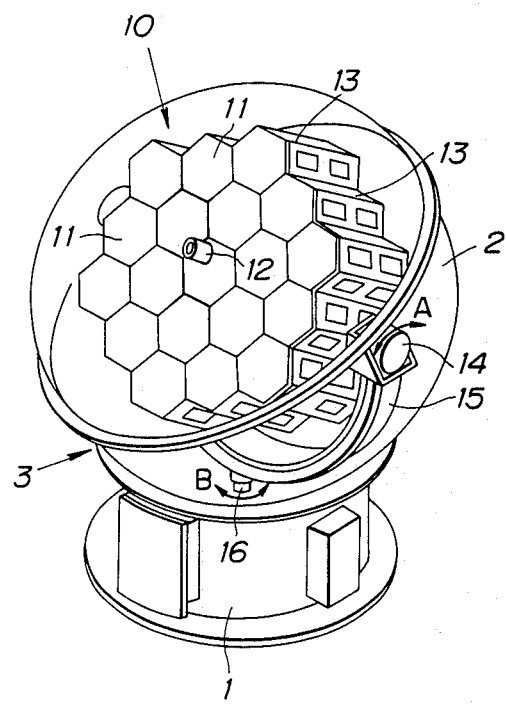
FIG. 3 is a structural view for explaining an embodiment of a solar ray collecting device which is employed for bringing the present invention into operation.

FIG. 3 is a detailed structural view for explaining a solar ray collecting device 10 shown in FIGS. 1 and 2. The solar ray collecting device 10 comprises a large number of lenses 11 (nineteen lenses in the embodiment shown in FIG. 3), a solar rays direction sensor 12 for detecting the direction of the solar rays, a support frame 13 for unitarily sustaining the lenses 11 and the solar rays direction sensor 12, a first motor 14 for rotatably moving in a direction shown by an arrow A the unitarily combined lenses 11, sensor 12, and support frame 13, a support arm 15 for supporting the afore-mentioned lenses 11, sensor 12, support frame 13, and motor 14, a rotatable shaft 16 installed so as to meet at a right angle with the rotatable shaft of the afore-mentioned motor 14, and a second motor not shown in FIG. 3 for rotating the rotatable shaft 16 in a direction shown by an arrow B.

The direction of the solar rays is detected by the afore-mentioned solar rays direction sensor 12. The signal generated by the sensor 12 controls the first motor and the second motor so as to direct the lenses 11 toward the sun at all times. The solar rays focused by the lenses 11 are guided into the optical conductor cable shown in FIG. 1 (not shown in FIG. 3), the light receiving end portion of which is located at the focus position of the lenses 11. And further, the solar rays are transmitted through the optical conductor cable into the container 20.

The present applicant has previously proposed various ways to focus solar rays by use of lenses or the like, to guide the same into an optical conductor, and thereby to transmit them onto an optional desired place through the optical conductor for use in illumination or for other like purposes.

However, in the case of employing the light energy transmitted through the optical conductor in such a manner as mentioned above as a photosynthesis light source for nurturing chlorella or intensively culture plants, a light source for fish culture, a light source for promoting human health, and a light source utilized for various other purposes, there are many cases in which only a desired light component suitable the purpose of utilization needs to be selectively separated and employed among the light components contained in the light energies.

However, although various techniques of cutting off infrared rays, ultraviolet rays, or the like have already been proposed up to now, a technique of taking out a light component of the specially designated wave length among the white light rays has not yet been proposed at all.

Figure 4:
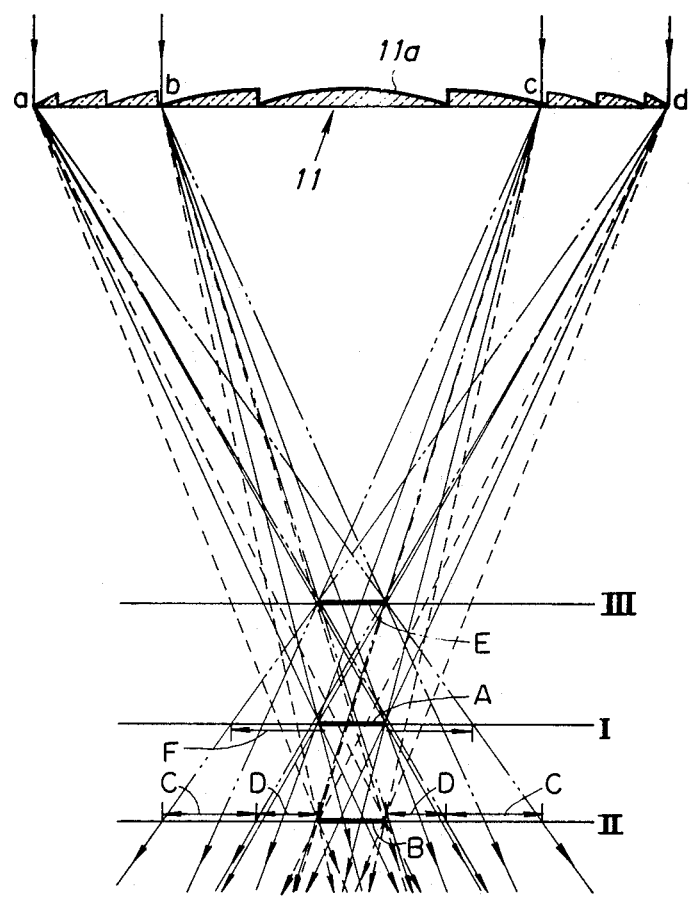
FIG. 4 is a construction view for explaining an embodiment of a light focusing lens capable of effectively taking out the light rays component of the desired wave length among the solar rays.

FIG. 4 is a construction view for explaining a method for introducing the solar rays collected by a lens into the optical conductor cable. In FIG. 4, 11 is a Fresnel lens, and 11a is a light intercepting membrane mounted on the central portion of the Fresnel lens 11. The solar rays or the artificial light rays arrive directly at the points; a, b, c and d, of the lens 11 are focused, respectively, as shown in FIG. 4.

Moreover, in FIG. 4, the green light rays are shown by solid lines, the red light rays by dotted lines, and the blue light rays by two-dots-and-dash lines, respectively. Therefore, at the portion A of the plane I in FIG. 4 comparatively pure green light rays are concentrated, at the portion B of the plane II comparatively pure red light rays, and at the portion E of the plane III comparatively pure blue light rays. Consequently, if each light-receiving edge of the optical conductor is put at those portions; A, B and E, respectively, the light rays having only the desired light component can be guided into the optical conductor.

Moreover, on the plane II, the portion C is a blue light component area, and the portion D is a green light component area. It has been described, heretofore, that the light-receiving edge of the optical conductor is moved to the direction of the lens optical axis so as to take out the light component of a desired wave length. However, the light component guided into the optical conductor can be also changed in accordance with the diameter of the optical conductor. For instance, if the diameter of the optical conductor is equal to F on the plane I, the visible light rays containing the light components from red to blue are guided into the optical conductor.

Figure 5:
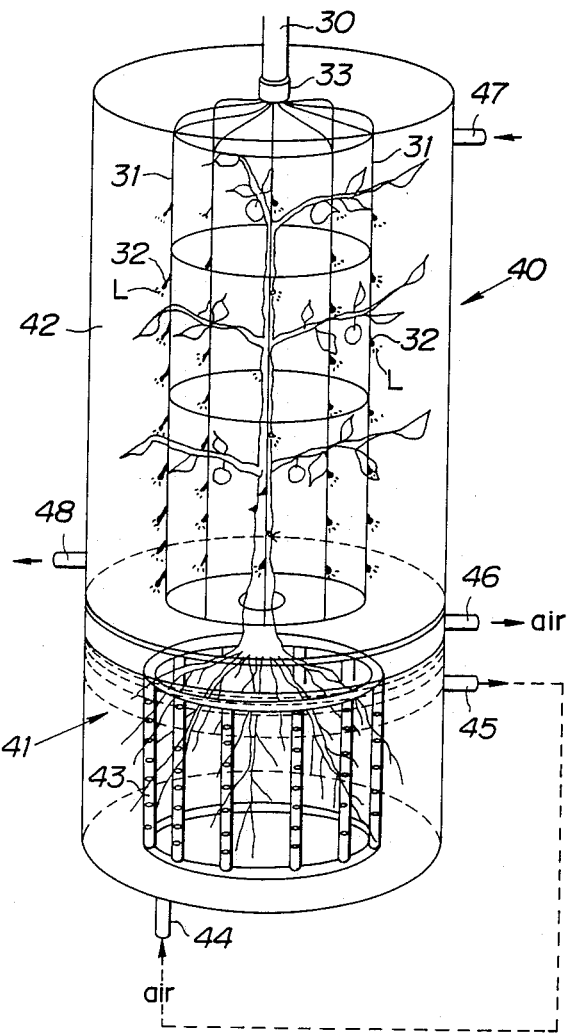
FIGS. 5 through 9 are views showing embodiments of the respective devices employed in the containers shown in FIGS. 1 and 2.

FIG. 5 is an overall structural view for explaining an embodiment of a plant cultivating device employed in the container 20 as shown in FIGS. 1 and 2. In FIG. 5, 40 is a plant cultivating device which is constructed with a dark room 41 for accommodating a root portion of plant P and an air-tight room 42 for accommodating a stem-and-leaf portion of plant P.

Supply tubes 43 having a large number of holes for supplying nutritious substance, oxygen, etc. necessary for growing the plant P are set up in the dark room 41. Culture fluid or the like supplied through an inlet pipe 44 to the above-mentioned multiple-holes tube 43 are discharged into the dark room 41 through the holes of the multiple-holes tubes 43 in order to supply necessary nutritious substance and oxygen to plants P.

In such a manner, after supplying nutritious substance and oxygen to plant P, drainage is withdrawn by an outlet pipe 45. After being replenished with nutritious substance and air, it circulates and is supplied again through the inlet pipe 44 into the dark room 41. Air is exhausted to the outside through an air exhaust pipe 46.

On the other hand, a large number of light emitters L necessary for causing a photosynthesis reaction are provided in the air-tight room 42. And further, an inlet pipe 47 and an outlet pipe 48 are attached to the air-tight room 42 for circulatingly carbon dioxide, high-temperature and high-humidity air, etc. into the air-tight room 42. The environmental condition is adjusted in accordance with the characteristics of the plants to be cultivated. For instance, the relative humidity is kept at 70%, the density of contained carbon dioxide at 3%, and the temperature at 25° C. through 28° C.

Moreover, any light rays of wave length necessary for causing photosynthesis reaction can be employed as the light source L. For instance, a xenon lamp can be employed. If possible, a cool light source generating no heat is preferable, because added heat in such a situation is not necessary for causing reaction. Concerning such a light source, a light-passing substance 32 having a refractive index larger than that of an optical fiber 31 is attached to the surface of the same fiber 31 as shown in FIG. 5. In such a construction, the light rays transmitted in the optical fiber 31 may be preferably discharged through the light-passing substance 32.

Furthermore, 30 is an optical conductor cable connected with the solar ray collecting device 10, and 33 is a photo coupling junction for connecting the optical conductor cable 30 with the plurality of optical fibers 31. A lens (or lenses not shown in FIG. 5) for focusing the solar rays is intallsed at the end portion of the optical conductor cable 30 as mentioned before. The light rays (solar rays) focused by the lens are guided into the optical conductor cable 30, pass through the optical conductor cable 30, and are further transmitted to the optical fibers 31. The same light rays transmitted in the optical fiber 31 are discharged through the light-passing substance 32.

The air-tight receptable 42 is constructed with transparent material and therefore the interior space thereof can be seen from the outside. Fruits of plant P nurtured as mentioned above can be harvested in the air-tight room after exchanging high-temperature and high-humidity air therein for normal clean air, for example. Alternatively, a large number of windows capable of being opened and closed may be provided on the circumferential wall portion, and the fruits of plant P can be harvested by hand from the windows.

Moreover, the present applicant has previously proposed a device for effectively nurturing plants, funguses, or fish by profitably combining a plant cultivating device absorbing carbon dioxide $CO_2$ and producing oxygen $O_2$ with a funguses cultivating device or a fish culture device absorbing oxygen $O_2$ and producing carbon dioxide $CO_2$. Those devices as mentioned above can be employed in the container 20.

Figure 6:
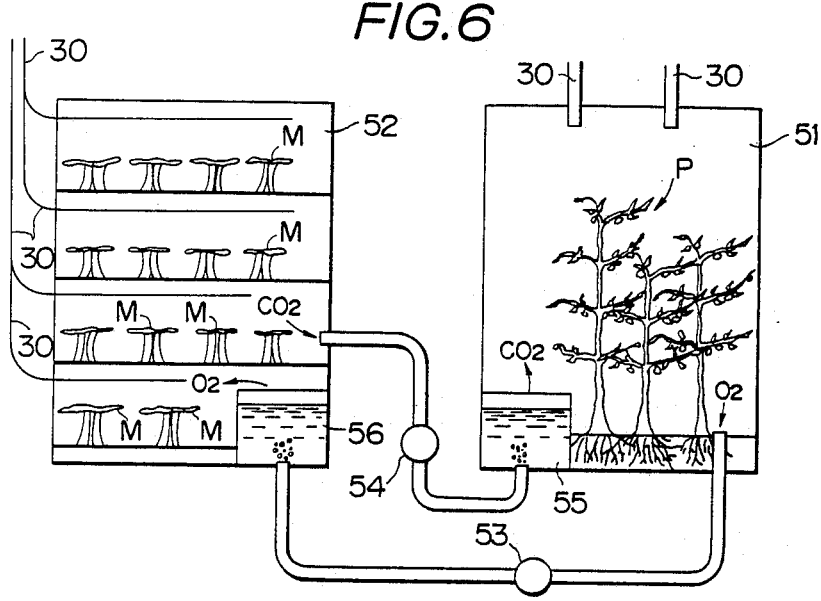

FIG. 6 is a cross-sectional structural view for explaining an embodiment of a device for nurturing fungi such as mushrooms or the like and nurturing plants such as tomatoes or the like in the afore-mentioned containers 20. In FIG. 6, 30 are optical conductor cables connected with the solar ray collecting device 10 as mentioned before, 51 a first air-tight receptacle for nurturing plants absorbing carbon dioxide $CO_2$ and producing oxygen $O_2$, 52 a second air-tight receptacle for nurturing funguses M such as, for instance, bracket fungus absorbing oxygen $O_2$ and producing carbon dioxide $CO_2$, 53 a first pumping device for supplying oxygen $O_2$ produced in the first air-tight receptable 51 into the second air-tight receptacle 52, and 54 a second pumping device for supplying carbon dioxide $CO_2$ produced in the second air-tight receptacle 52 into the first air-tight receptacle 51.

Oxygen $O_2$ produced in the first air-tight receptacle 51 and carbon dioxide $CO_2$ produced in the second air-tight receptacle 52 are exchanged for each other in order to supply a sufficient amount of oxygen $O_2$ to the plants in the first air-tight receptacle 51 and supply a sufficient amount of carbon dioxide $CO_2$ to funguses in the second air-tight receptacle 52.

And further, in the afore-mentioned living thing nurturing device the temperature in the air-tight receptacle 51 for nurturing plants is kept at 20° C. approximately and the relative humidity therein is kept below 60% approximately while the temperature in the air-tight receptacle 52 for nurturing funguses or the like is kept at 30° C. approximately and the relative humidity therein is kept above 80% approximately. Therefore, both the plants and funguses can be nurtured effectively. If air contained in the air-tight receptacle 51 is merely passed into the air-tight receptacle 52, the temperature in the receptacle 52 will drop and the relative humidity therein drop. On the other hand, air contained in the air-tight receptable 52 and passed into the air-tight receptacle 51 will cause the temperature in the receptacle 51 to rise and the relative humidity therein to rise. In order to settle the problems as mentioned above, as shown in FIG. 6, a water tank 55 is installed in the air-tight receptacle 51 and another water tank 56 is installed in the air-tight receptacle 52. The temperature of the water tank 55 is controlled at a value, for instance, 15° C. approximatlely which is a little lower than the temperature suitable for nurturing plants in the air-tight receptacle 51, and the temperature of the water tank 52 is controlled at a value, for instance, 35° C. approximately which is a little higher than the temperature in the air-tight receptacle 52. Air contained in the air-tight receptacle 52 is supplied into the air-tight receptacle 51 through the water tank 55, while air contained in the air-tight receptacle 51 is supplied into the air-tight receptacle 52 through the water tank 56.

In such a manner, air of high temperature and high humidity in the air-tight receptacle 52 is supplied into the air-tight receptacle 51 by passing through the water tank 55, and the temperature in the receptable 51 is kept at 20° C. approximately and the relative humidity therein is kept a less than 60% approximately. On the other hand, air of low temperature and low humidity in the air-tight receptacle 51 is supplied into the air-tight receptacle 52 by passing through the water tank 56, and the temperature in the receptacle 52 is kept at 30° C. approximately and the relative humidity therein is kept at more than 80% approximately.

Consequently, the temperature and the humidity in the air-tight receptacle 51 are always kept respectively at the values suitable for nurturing plants in the air-tight receptacle 51, and a sufficient amount of carbon dioxide $CO_2$ necessary for nurturing the plants is supplied to plants. At the same time, the temperature and the humidity in the air-tight receptacle 52 are also kept respectively at the values suitable for nurturing funguses in the air-tight receptacle 52 at all times, and a sufficient amount of oxygen $O_2$ necessary for nurturing funguses is supplied the to funguses.

Figure 7:
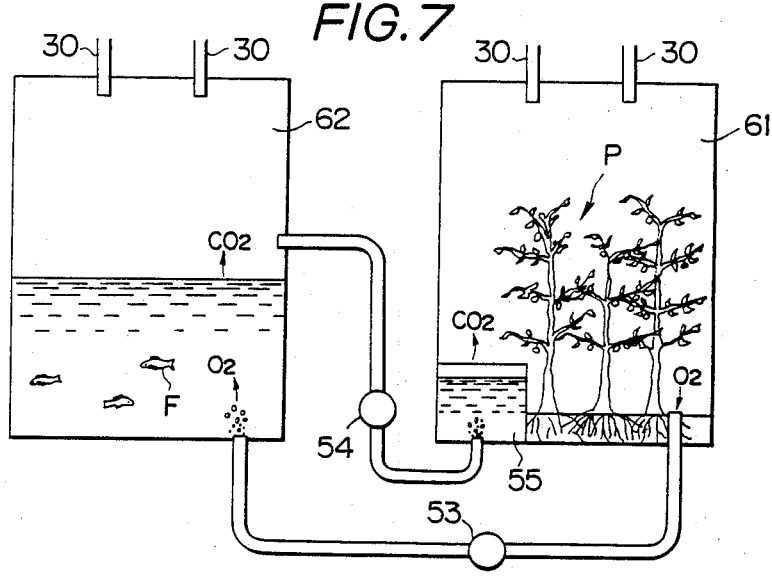

FIG. 7 is a cross-sectional structural view for explaining another embodiment of a device for fish culture and nurturing plants. In this embodiment, fish are employed as the living organisms absorbing oxygen $O_2$ and producing carbon dioxide $CO_2$. Namely, fish F are employed instead of funguses M as in the embodiment shown in FIG. 6. In FIG. 7, 61 is an air-tight receptacle for fish culture. Concerning the other reference numerals, the same reference numeral as that of FIG. 6 is used in association with the part performing the same action as that of the device shown in FIG. 6. As is the case of the embodiment shown in FIG. 6, carbon dioxide $CO_2$ produced by the fish is utilized for nurturing plants and oxygen produced by plants is utilized for fish culture, in this embodiment.

Furthermore, although only oxygen $O_2$, carbon dioxide $CO_2$, the temperature and the humidity have been described heretofore, various conditions other than the above-mentioned, for instance, nutritious substance, light rays, etc. are needed for nurturing plants, funguses, fish or the like. Concerning the light rays, the solar rays collected by the solar ray collecting device 10 are supplied to plants or the others through the optical conductor cables 30 as mentioned before.

Figure 8:
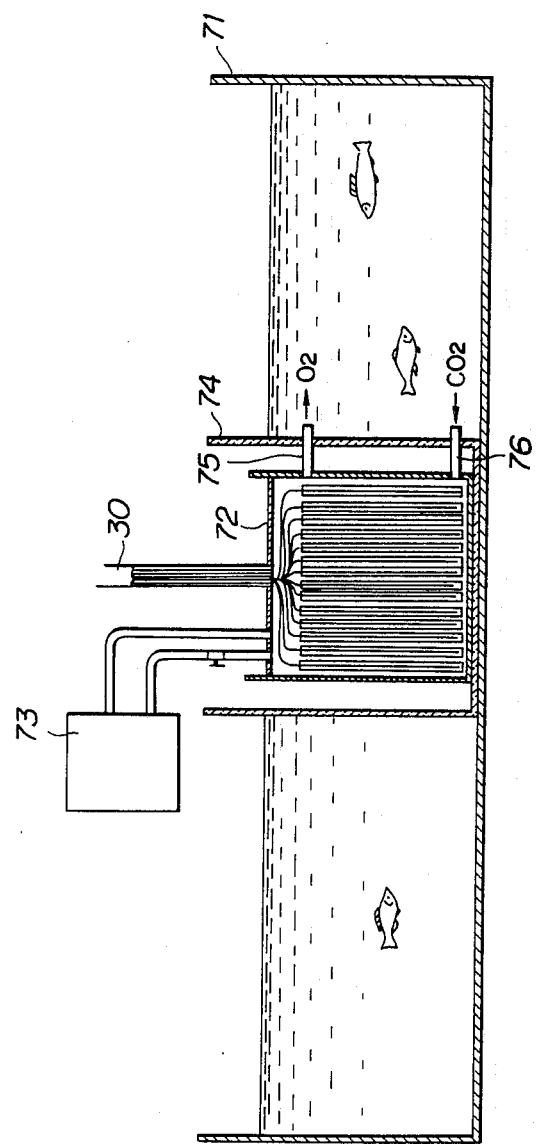

FIG. 8 is a cross-sectional structural view showing an embodiment of a device in which chlorella is cultivated in the above-mentioned container 20 and utilized as a bait for feeding fish.

The device shown in FIG. 8 is constructed by effectively combining a photosynthesis tub for cultivating algae and a fish feeding tub together. Stated in more detail, a product produced by the process of photosynthesis is supplied to fish as a source of nutritious substance. And further, oxygen $O_2$ discharged from the photosynthesis tub for cultivating algae is supplied to fish while excrement excreted by the fish is supplied to chlorella as a source nutritious substance and carbon dioxide $CO_2$ discharged by the fish is also supplied thereto. Furthermore, a chlorella cultivating light source can be commonly used for a fish feeding light source.

In FIG. 8, 71 is a fish feeding tub, 72 a chlorella cultivating tub, 73 a chlorella harvesting device for taking out chlorella produced in the chlorella cultivating tub 72, and 74 a transparent partition wall for providing a water-tight separation between the chlorella cultivating tub 72 from the fish feeding tub 71. All of those elements are installed in the afore-mentioned container 20. The quality of the water contained in the fish feeding tub 71 is changed in accordance with the kind of fish to be fed therein. For instance, fresh water is used for feeding fresh water fish and sea-water is used for feeding sea-water fish.

Solar rays collected by the solar ray collecting device 10 are focused by the lenses or the like and guided into the optical conductor cable 30 as mentioned before, and further transmitted through the optical conductor cable 30 to the chlorella cultivating tub 72 as a photosynthesis light source. At the chlorella cultivating tub 72 time, carbon dioxide $CO_2$ is supplied to the same. Chlorella is cultivated in the liquid in the chlorella cultivating tub 72 which is supplied with the carbon dioxide $CO_2$. Chlorella produced in such a manner is harvested at a proper time and supplied into the fish breeding tub 71 as food for breeding the fish. On the other hand, oxygen $O_2$ produced by cultivating chlorella is supplied into the fish feeding tub 71 through a pipe 75 having a filter therein.

For feeding in the fish feeding tub 71 the bait and oxygen $O_2$ are supplied to fish as mentioned before. On that occasion, carbon dioxide $CO_2$ discharged by the fish is supplied into the chlorella cultivating tub 72 through a pipe 76 and used for cultivating chlorella. At the fish time, dung evacuated by the fish into the water in the fish feeding tub 71 is also supplied along with such water and carbon dioxide into the chlorella cultivating tub through the pipe 76 for the purpose of using it as nutritious substance source for chlorella. In such a way, not only cultivation of chlorella can be performed much more effectively but also the inside of the fish feeding tub 71 can be kept clean.

Light rays for causing a photosynthesis reaction are supplied into the chlorella cultivating tub 72 through the optical conductor cable 30 from the light source, as mentioned before. If the outside wall of the chlorella cultivating tub 72 is constructed with transparent material, light rays in the chlorella cultivating tub 72 leak outside thereof and are supplied into the fish feeding tub 71. In such a manner, the light rays can be also used as a light source for feeding fish. On that occasion, when both the chlorella cultivating tub 72 and the fish feeding tub 71 are separated from each other by use of the transparent partition wall 74, withdrawal of chlorella, maintenance and checking of the chlorella cultivating tub 72, etc. can be easily done.

Figure 9:
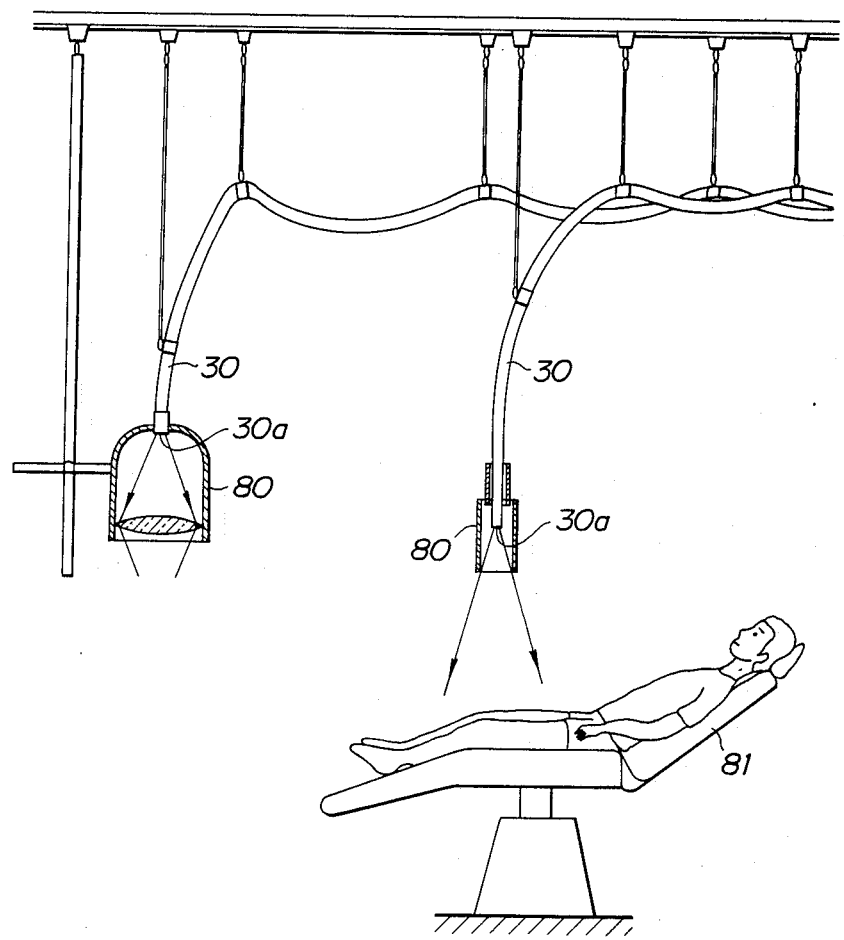

FIG. 9 is a structural view of a device in which solar rays collected by the solar ray collecting device 10 as mentioned above are guided into the container 20 through the optical conductor cable 30 for the purpose of utilizing those solar rays to promote the human body's health and perform medical treatment.

In recent years, a large number of persons suffer from incurable diseases such as arthritis, neuralgia and rheumatism, or a pain, an injury scar or a bone fracture, or a pain of an ill-defined disease. Furthermore, any person cannot avoid growing-old and aging of one's skin which progresses gradually from a comparatively young age. On the other hand, as mentioned before, the present applicant has previously proposed to focus solar rays by use of lenses or the like, to guide solar rays into an optical conductor cable, and to transmit solar rays onto an optional desired place through the optical conductor cable. Those solar rays transmitted in such a way are employed for use in illuminating or for other like purposes for example, to cultivate plants, chlorella, or the like. Visible ultraviolet and infrared promote the human body's health or prevent the human body's skin from aging. And further, those visible light rays have noticeable effects in curing and stopping the pain or arthritis, neuralgia, bedsores (decubitus), rheumatism, injuries, bone fractures, or the like. Such effects obtained by use of the device according to the present invention have been already found out by the present applicant.

FIG. 9 is a structural view showing an embodiment of a device for promoting the human body's health, preventing the skin the of human body from growing old, or curing and stopping the pain of the arthritis, neuralgia, bedsores, rheumatism, injuries, bone fractures, in such a manner as described heretofore. In FIG. 9, 30 is an optical conductor cable into which solar rays collected by the solar ray collecting device 10 shown in FIG. 1 are guided, as mentioned before. Those guided solar rays are transmitted onto the container shown in FIG. 1 through the optical conductor cable 30. As previously proposed by the present applicant, white rays corresponding to the visible light rays component contained in solar rays are transmitted therethrough. The numeral 80 represents a hood member installed at the light emitting end portion 30a of the optical conductor cable 30, and the numeral 81 represents a medical treatment chair. When a patient is placed under medical care, the patient is put on the medical treatment chair 81 and the light rays comprising the visible light rays component transmitted through the optical conductor cable 30 as mentioned before are applied to the diseased or injured part of the patient. As described heretofore, the light rays applied to the diseased in injured part of the patient correspond to the visible light rays component of solar rays and contain neither ultraviolet rays nor infrared rays. By use of such light rays, medical treatment can be performed without exerting any harmful influence on the human body by ultraviolet rays or infrared rays.

As described heretofore, since only the visible light rays component of solar rays is applied to the diseased or injured part of the patient by use of the afore-mentioned device, there is no harmful influence thereon by ultraviolet rays and infrared rays. Especially, in the case of ultraviolet rays, a cancer grows under the influence of accumulated ultraviolet rays. And further, in the case of infrared rays, the temperature rises up to an extreme degree under the influence of accumulated infrared rays so that a desired amount of light cannot be radiated. According to the above-mentioned device, such harmful influence doesn't exist at all so that a desired amount of light can be radiated for a desired period. Furthermore, the outlined condition of the light rays component can be known at this time.

I claim:

1. A nurturing device for nurturing living organisms in desert and tropical regions comprising a plurality of heat-insulated and air-tight container means juxtaposed to one another, nurturing means in each of said container means for nurturing a living organism therein, at least some of said container means being disposed on top of one another to form a vertical array of said container means, a plurality of said vertically arrayed container means being arrayed in a radial disposition generally radiating from a central portion, said vertical array having a top container means, solar ray collecting means for collecting solar rays, said solar ray collecting means being disposed on top of said central portion at a position at least as high as said top container means, optical transmission means between said solar ray collecting means and each of said container means, said optical transmission means comprising optical conductor means and selective separation means, said optical conductor means extending between said solar ray collecting means and said selective separation means for conducting collected solar rays to said selective separation means, said selective separating means separating undesired light components from desired light components of said collected solar rays, said optical conductor means further extending between said selective separation means and each of said container means for conducting the desired light rays from said selective separation means to each of said container means, whereby each of said vertically arrayed container means is supplied with said desired light components from the collected solar rays to thereby provide for effective nurturing of said living organisms in each of said container means.

* * * * *